United States Patent [19]

Yano

[11] Patent Number: 5,677,746
[45] Date of Patent: Oct. 14, 1997

[54] BACK LIGHT DEVICE FOR USE IN LIQUID CRYSTAL DISPLAYS

[75] Inventor: Takakazu Yano, Tokyo, Japan

[73] Assignee: NEC Corporation, Tokyo, Japan

[21] Appl. No.: 515,200

[22] Filed: Aug. 15, 1995

[30] Foreign Application Priority Data

Aug. 31, 1994 [JP] Japan .................. 6-206458

[51] Int. Cl.$^6$ .............. G02F 1/1333; G02F 1/1335; F21S 3/00; F21V 29/00
[52] U.S. Cl. .............. 349/58; 349/65; 362/218; 362/373
[58] Field of Search .................. 359/83, 48, 49, 359/50; 362/218, 294, 373; 349/58, 61, 62, 65, 66

[56] References Cited

U.S. PATENT DOCUMENTS

| 4,287,554 | 9/1981 | Wolff .................. 362/218 |
| 4,600,009 | 7/1986 | Kramer et al. .................. 362/218 |
| 4,683,887 | 8/1987 | Kramer et al. .................. 362/218 |
| 5,050,055 | 9/1991 | Lindsay et al. .................. 362/294 |
| 5,299,038 | 3/1994 | Hamada et al. .................. 359/49 |
| 5,479,327 | 12/1995 | Chen .................. 362/218 |

FOREIGN PATENT DOCUMENTS

| 63-13202 | 1/1988 | Japan . |
| 3-204618 | 9/1991 | Japan .................. 359/48 |
| 4-120513 | 4/1992 | Japan .................. 359/48 |
| 6-34971 | 2/1994 | Japan .................. 359/48 |
| 6-273765 | 9/1994 | Japan .................. 359/50 |

*Primary Examiner*—William L. Sikes
*Assistant Examiner*—Tiep H. Nguyen
*Attorney, Agent, or Firm*—Whitham, Curtis, Whitham & McGinn

[57] ABSTRACT

The back light device for a liquid crystal display disclosed has a photoconductor, a light source, a reflection plate, and a pair of resin blocks. A case is placed at a back surface of the photoconductor for holding the reflection plate and fixing the photoconductor. In the case, a plurality of consecutive cutouts are provided at a portion that holds the reflection plate. The consecutive cutouts are perpendicular to an axis of the light source. This structure enables the dissipation of the heat accumulated in the reflection plate through the consecutive cutouts.

4 Claims, 2 Drawing Sheets

BACK LIGHT DEVICE FOR USE IN LIQUID CRYSTAL DISPLAYS

BACKGROUND OF THE INVENTION

1. Field of the Invention

The present invention relates to a back light device for use in liquid crystal displays, and more particularly to a back light device of a photoconductor system having a light source placed at end faces of a photoconductor.

2. Description of the Related Art

A conventional back light device for a liquid crystal display (hereinafter referred to as a "back light device") has a pair of light sources using cold cathode discharge tubes disposed respectively at two end faces of a photoconductor in a photoconductor system. As shown in FIG. 1, the conventional back light device has a photoconductor 2 arranged such that multiply reflected incident light is used as a surface light source, a pair of cold cathode discharge tubes 3 disposed respectively at the two end faces of the photoconductor 2, a pair of reflection plates 5 which are respectively disposed covering the cold cathode discharge tubes 3 and which reflect light from the cold cathode discharge tubes 3 into the photoconductor 2, two resin blocks (not shown) respectively holding the two ends of each of the cold cathode discharge tubes 3 and fixing the cold cathode discharge tubes 3 at a predetermined position with respect to the reflection plates 5, and a case 1 disposed at a back surface of the photoconductor 2 for holding the reflection plates 5 and for fixing the photoconductor 2. The back light device is mounted on a liquid crystal display panel with a back shield plate 6 interposed therebetween.

The back light device of the photoconductor system structured as above does not allow diffusion of the heat generated due to the emission of light from the cold cathode discharge tubes 3, because each of the reflection plates 5 is covered by the entire end face of the case 1. The temperature at the center section of the liquid crystal display panel is higher by 10°–15° C. than the atmospheric temperature. For this reason, the screen image is nonuniform. For preventing the rising of temperature, in an arrangement disclosed in Japanese Patent Application Kokai Publication No. Sho 63-13202, an optical system is provided with a member having a reflection surface for reflecting a beam of light emitted from a light source and a radiating member for radiating out the heat generated at the light source. This prevents the degradation of the liquid crystal display panel and the light source itself. Here, the cold cathode discharge tube generates heat when the light is emitted, and the temperature especially at the tube end portion (part of electrode) rises to 80°–90° C.

However, in the back light device structured as above, the heat distribution at the cold cathode discharge tube is not taken into consideration. Therefore, where this back light device is used as the light source, the temperature of the liquid crystal display panel rises due to the heat radiation from the cold cathode discharge tube. Thus, temperature differences occur between temperatures at the center section and those at the peripheral portion of the liquid crystal display panel, and the heating is greater especially at the tube end portion. Therefore, if such a liquid crystal display device is used, the screen image is nonuniform due to the voltage fluctuation which is caused by the threshold level fluctuation of transistors of the liquid crystal display panel.

As a means for solving the above problem, Japanese Patent Application Kokai Publication No. Hei 3-204618 shows a structure wherein a radiation plate is used for attaining uniform screen image. This structure has a radiating portion disposed outside the case and fixing members extending from the radiating portion into the case so as to fix the ends of the cold cathode discharge tube.

In the conventional back light device described above, the screen image becomes nonuniform so that, for solving this problem, it is necessary to provide especially the radiation plate having the radiating portion placed outside the case and a fixing member extending from the radiating portion into the case and fixing the ends of the cold cathode discharge tube. For this reason, the structure of the back light device becomes complex, so that the number of fabrication steps and the material costs are increased. Thus, the above structure hinders the miniaturization and weight reduction of liquid crystal display devices.

SUMMARY OF THE INVENTION

An object of the present invention, therefore, is to solve the above problems existing in the prior art, and to provide a back light device for a liquid crystal display, which is low cost, compact and light-weight, and provides uniform screen image.

According to one aspect of the invention, there is provided a back light device for a liquid crystal display comprising:

- a photoconductor in which incident light multiply reflected is used as a surface light source;
- a light source which is disposed at least at one of two end faces of the photoconductor;
- a reflection plate which is disposed to cover the light source, for reflecting light from the light source into the photoconductor;
- a resin block which is provided at each end of the light source and fixes the light source at a predetermined position with respect to the reflection plate;
- a case which is placed at a back surface of the photoconductor for holding the reflection plate and fixing the photoconductor; and
- a plurality of consecutive cutouts which are provided in the case at a portion that holds the reflection plate.

According to the invention, a plurality of consecutive cutouts are provided perpendicularly of an axis of the cold cathode discharge tube in the case at a portion that holds the reflection plate. Therefore, the heating of the liquid crystal display panel is prevented.

Also, since a material such as a radiation plate is not necessary, the liquid crystal display device is obtained at a low cost, is compact and is light weight.

BRIEF DESCRIPTION OF THE DRAWINGS

The above and other objects, features and advantages of the present invention will be apparent from the following description of a preferred embodiment of the invention explained with reference to the accompanying drawings, in which.

PREFERRED EMBODIMENT OF THE INVENTION

Now, a preferred embodiment of the invention is explained with reference to the drawings.

Figure 1:
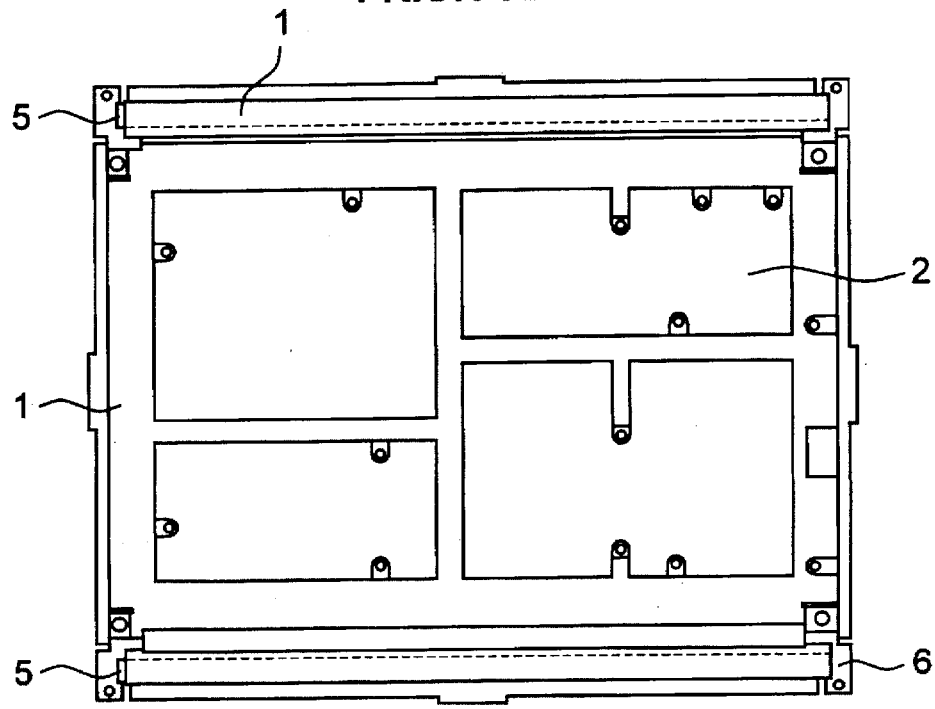
FIG. 1 is a back side view of an example of a conventional back light device.
Figure 3:
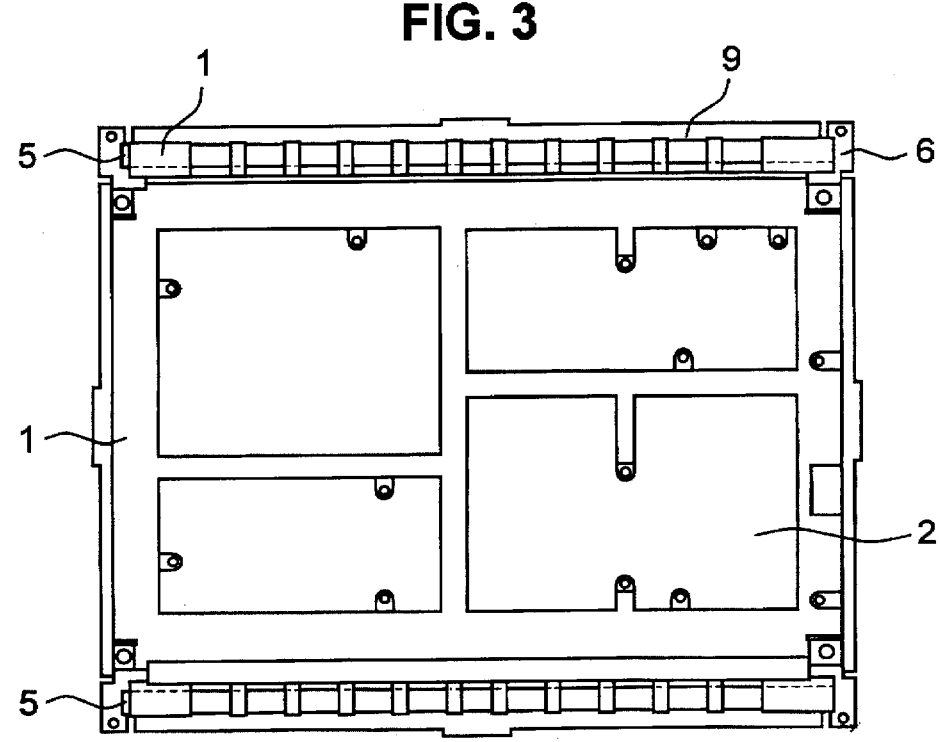
FIG. 3 is a back side view, after assembly, of the back light device shown in FIG. 2.
Figure 2:
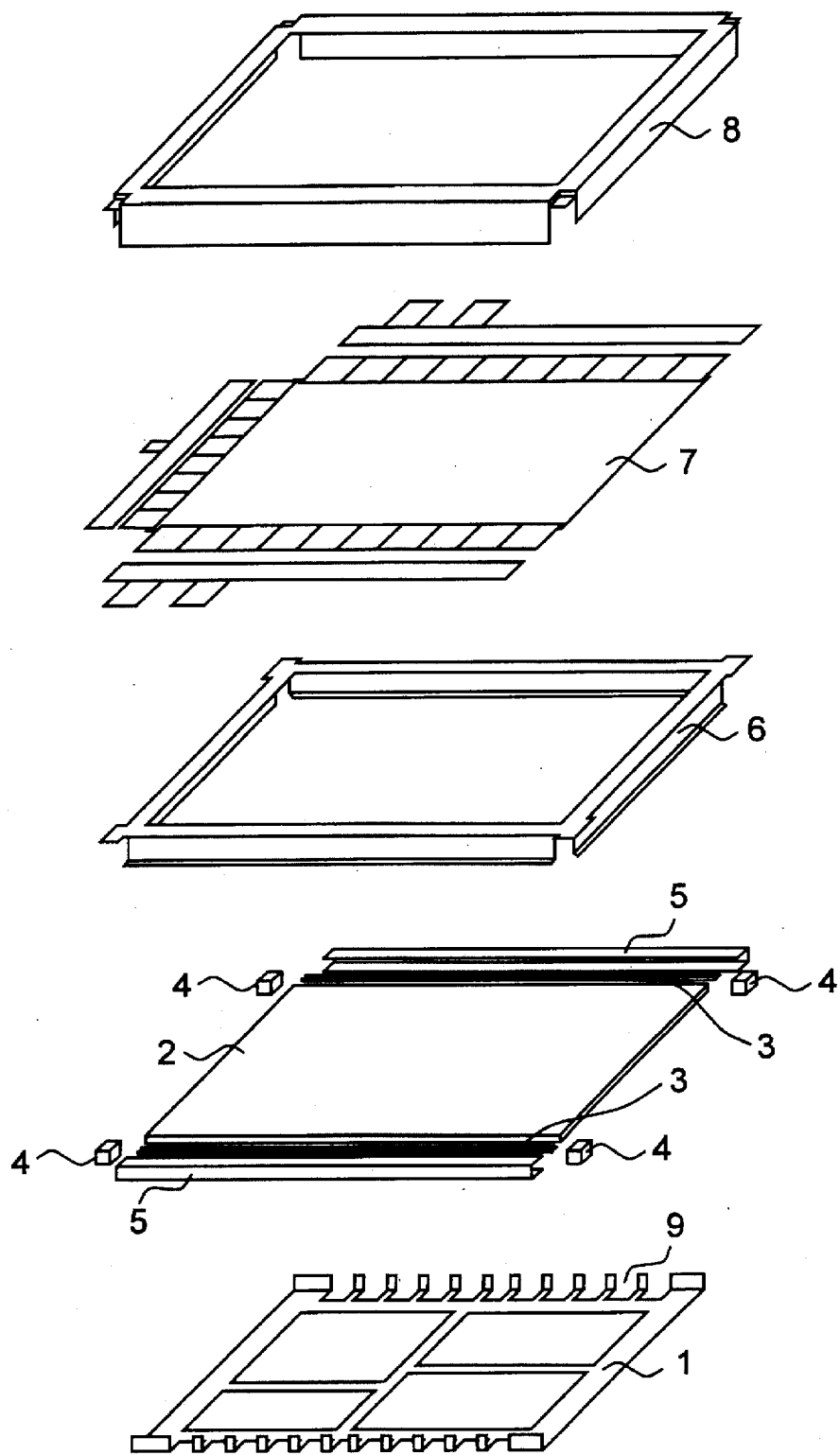
FIG. 2 is a set of exploded perspective views of a back light device of an embodiment according to the invention.

FIG. 2 shows, in a set of exploded perspective views, a back light device of an embodiment according to the invention. FIG. 3 shows, in a back side view, the assembled back light device shown in FIG. 2. As shown in FIGS. 2 and 3, the back light device according to the invention has a photoconductor 2 arranged such that multiply reflected incident light is used as a surface light source, a pair of cold cathode discharge tubes 3 disposed respectively at two end faces of the photoconductor 2, a pair of reflection plates 5 which are respectively disposed covering the light sources so as to reflect light from said light source into the photoconductor 2, two resin blocks 4 respectively holding the ends of each of the cold cathode discharge tubes 3 and fixing the cold cathode discharge tubes 3 at a predetermined position with respect to the reflection plate 5, and a case 1 placed at a back surface of the photoconductor 2 for holding the reflection plates 5 and for fixing the photoconductor 2. The back light device is mounted on a liquid crystal display panel 7 with a back shield plate 6 interposed therebetween. In the case 1, a plurality of consecutive cutouts 9 in a comb-like form are provided at a portion that holds each reflection plate 5 with the cutouts 9 being perpendicular to an axis of each cold cathode discharge tube 3 and that the heat generated at the cold cathode discharge tube 3 is dissipated directly by the cutouts 9 through the reflection plate 5.

With the above construction, where this back light device is used, the temperature of the cold cathode discharge tubes 3 rises, and the heat accumulates at the reflection plate 5. However, the accumulated heat is dissipated through the cutouts 9 at the center portions of the cold cathode discharge tubes 3 by heat diffusion, while the accumulated heat is radiated through the resin blocks 4 by heat conduction at the end portions of the cold cathode discharge tubes 3. Therefore, the temperature rise in the liquid crystal display panel 7 is suppressed not rise beyond 5° C. with respect to the atmospheric temperature. Thus, the advantages are that the liquid crystal display device obtained provides uniform screen image, is low cost, compact and light weight.

The above explanation is made using an example wherein the cold cathode discharge tubes 3 are disposed at each of the two end faces of the photoconductor 2. However, this invention is applicable to a case where the cold cathode discharge tube 3 is placed at one end face of the photoconductor 2, with the same effect being obtained.

While the invention has been described in its preferred embodiments, it is to be understood that the words which have been used are words of description rather than limitation and that changes within the purview of the appended claims may be made without departing from the scope of the invention as defined by the claims.

What is claimed is:

1. A back light device for a liquid crystal display comprising:

a photoconductor in which incident light that is multiply reflected is used as a surface light source;

a light source which is disposed at least at one of two end faces of the photoconductor;

a reflection plate which is disposed to cover the light source, for reflecting light from said light source into said photoconductor;

a resin block which is provided at each end of said light source and fixes said light source at a predetermined position with respect to the reflection plate;

a case which is placed at a back surface of said photoconductor for holding said reflection plate and fixing said photoconductor; and a plurality of consecutive cutouts which are shaped in a comb-like form, and which are uniformly provided in at least one side of said case at a portion that holds said reflection plate.

2. The back light device for a liquid crystal display according to claim 1, in which said consecutive cutouts are perpendicular to an axis of said light source.

3. The back light device for a liquid crystal display according to claim 1, in which said light source is a cold cathode discharge tube.

4. A back light device according to claim 1, wherein said plurality of cutouts having said comb-like form and being uniformly provided uniformly distribute heat radiated from said reflection plate, whereby said liquid crystal display provides a uniform screen image.

* * * * *